United States Patent [19]

Iwasa et al.

[11] Patent Number: 5,187,381
[45] Date of Patent: Feb. 16, 1993

[54] SWITCH DEVICE FOR USE IN A POWER DRIVEN WINDOW APPARATUS

[75] Inventors: Hiroki Iwasa; Chikao Nagasaka; Masuyuki Ueda; Shigeru Kato; Hisashi Aoki; Makoto Shibahara; Satoshi Mori, all of Aichi, Japan

[73] Assignee: Kabushiki Kaisha Tokai-Rika-Denki-Seisakusho, Aichi, Japan

[21] Appl. No.: 440,120

[22] Filed: Nov. 24, 1989

[30] Foreign Application Priority Data

Nov. 25, 1988 [JP] Japan ............................ 63-153267[U]

[51] Int. Cl.$^5$ ............................................... B60J 1/08
[52] U.S. Cl. ..................................... 307/10.1; 49/13; 180/289; 340/438
[58] Field of Search ............... 307/10.1; 318/264–267, 318/281–286; 49/13, 14, 24, 26–28, 31; 340/438, 686; 180/289, 287

[56] References Cited

U.S. PATENT DOCUMENTS

| 4,611,154 | 9/1986 | Lambropoulos et al. | 318/490 |
| 4,649,286 | 3/1987 | Takeda et al. | 307/10.1 |
| 4,701,629 | 10/1987 | Citroën | 307/10.1 |
| 4,887,263 | 12/1989 | Steely | 370/85.1 |

Primary Examiner—Sharon D. Logan
Assistant Examiner—David Osborn
Attorney, Agent, or Firm—Sixbey, Friedman, Leedom & Ferguson

[57] ABSTRACT

A switch device for use in a power window for opening and closing a door glass of a vehicle. The switch device is driven by a driving apparatus and has a display unit for displaying whether the door glass can be opened or closed by means of an operating switch via the driving apparatus. Accordingly, it is possible to visually confirm whether or not the driving apparatus can be driven.

15 Claims, 6 Drawing Sheets

SWITCH DEVICE FOR USE IN A POWER DRIVEN WINDOW APPARATUS

BACKGROUND OF THE INVENTION

1. Field of the Invention

The present invention relates to a switch device for use in a power window apparatus adapted to open and close a door window of a vehicle by means of a driving force of a driving means.

2. Description of the Related Art

Conventionally, there are vehicles of a type in which a power window apparatus is provided for opening and closing a door glass by means of a driving force of a motor or the like driven by the operation of a switch. Since the electric power for operating this power window apparatus is relatively large, an arrangement is provided in which the power window apparatus is made operative only when an ignition switch (hereinafter referred to as the IG switch) is on, thereby preventing the so-called dying of a battery.

However, there is a case where the IG switch is turned off inadvertently with the door glass left open after the running of the vehicle. In this case, it is necessary to turn on the IG switch again to close the door glass making for poor operating efficiency. For this reason, a means has been devised which is capable of making the power window apparatus operative even in the case where the IG switch is turned off with the door glass open.

Within such means there is one which allows the power window apparatus to be operative for a predetermined period (generally about 30 seconds) by operating a timer after the turning off of the IG switch. In another example, a power window apparatus is operative when the door is open even if the IG switch turned off. It remains operative until the door is closed. In either means, even if the door glass is unknowingly left unclosed, it is unnecessary to turn on the IG switch again, so that operating efficiency can be improved.

However, even if the above-described means are applied, since there are times when the power window apparatus is operative and inoperative with the IG switch in the off state, the occupant cannot distinguish whether or not the power window apparatus is presently operative. In particular, even in the case where a timer is used, when the aforementioned predetermined time has elapsed, the occupant cannot judge whether or not the power window apparatus will actually operate unless an operation switch therefor is operated. Hence, in such an instance the timer provided is not helpful in determining the operative state of the power window apparatus. Furthermore, if a means interlocked with the opening and closing operation of the door is used, since the power window apparatus is nonoperative if, after the IG switch is turned off, the door is opened and then closed, the occupant must judge whether or not the door has been opened once, presenting an inconvenience to the occupant.

In addition, since there is no means for collectively confirming whether or not all the door glasses have been closed completely, it is necessary to either visually check the doors or operate all the operation switches in the closed direction regardless of whether the door glasses are open or closed.

SUMMARY OF THE INVENTION

Accordingly, an object of the present invention is to provide a switch device which is capable of confirming the operation of a power window apparatus thereby improving the operating efficiency and thus overcoming the above-described drawbacks of the present invention.

Another object of the present invention is to provide a switch device which is capable of collectively confirming the open or closed state of door glasses.

To these ends, in accordance with one aspect of the invention, there is provided a switch device for use in a power window apparatus for opening and closing a door glass of a vehicle through the operation of driving means, comprising: an operating switch for operating the driving means; a display unit disposed in the vicinity of the operating switch; and display controlling means, operated by means of the operating switch for displaying on the display unit whether or not the driving means is operative.

In accordance with this aspect of the invention, whether or not the power window apparatus is operative can be confirmed by the display unit being lit or unlit. Therefore, when the door glass is left unclosed after the IG switch is turned off and the occupant leaves the vehicle, it is readily possible for the occupant to determine whether the IG switch is to be turned on again or whether the door window can be closed by operating the operating switch. Hence, the operating efficiency can be improved.

In accordance with another aspect of the invention, there is provided a switch device for use in a power window apparatus for opening and closing a door glass of a vehicle through the operation of driving means, comprising: an operating switch for operating the driving means; a door glass detecting sensor for detecting whether or not the door glass is fully closed; a display unit disposed in the vicinity of the operating switch; and display controlling means, operated by means of the operating switch, for displaying on the display unit whether or not the driving means is operative and displaying on the display unit on the basis of an output of the door glass detecting sensor whether or not the door glass is fully closed.

In accordance with this aspect of the invention, whether or not the door glass is fully closed can be detected by the glass detecting sensor, and the result can be displayed on the display unit. Therefore, it is unnecessary for the occupant to visually confirm whether or not each door glass is closed or tentatively operate the operating switch in the door glass-closing direction which is, in some cases, unnecessary. Thus, the occupant can collectively confirm the open and closed states of the door glasses by the state of display on the display unit.

The above and other objects, features and advantages of the present invention will become more apparent from the following detailed description of the invention when read in conjunction with the accompanying drawings.

DESCRIPTION OF THE PREFERRED EMBODIMENT

Referring now to the accompanying drawings, a description will be given of an embodiment of the present invention.

Figure 1:
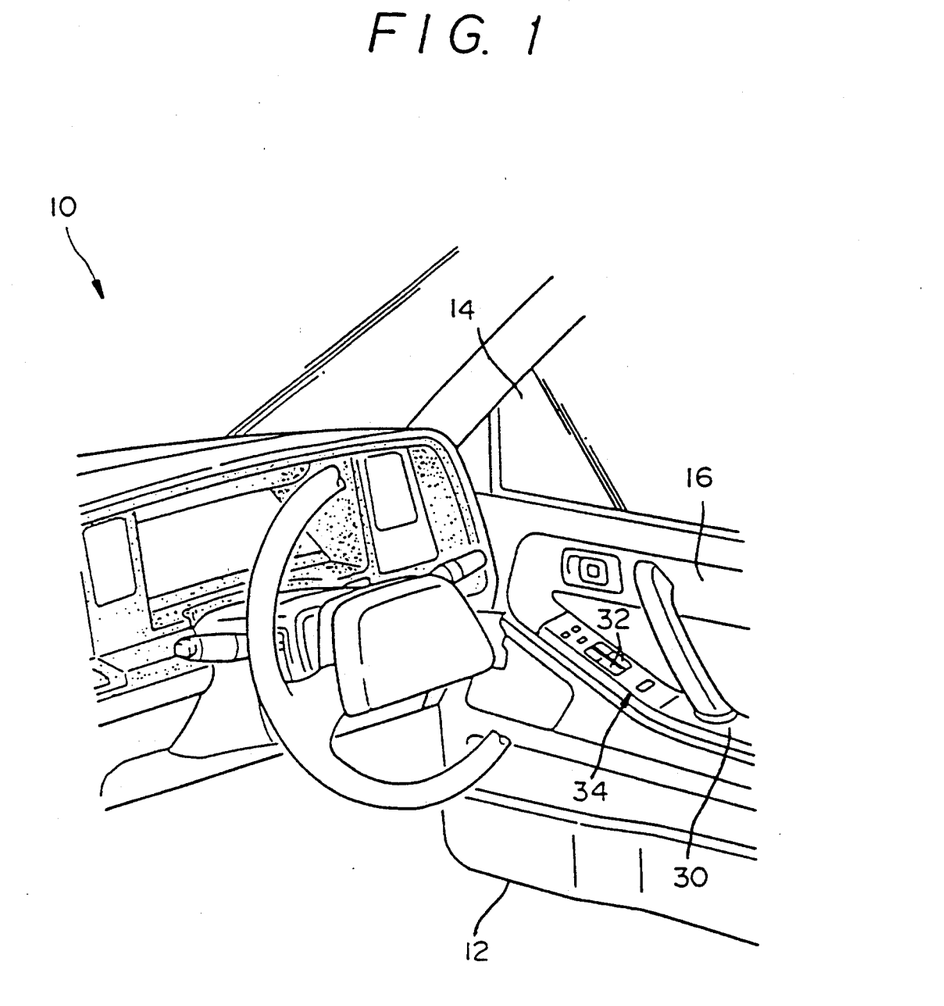
FIG. 1 is a perspective view of the vicinity of a driver's seat of a vehicle in accordance with an embodiment of the present invention.
Figure 2:
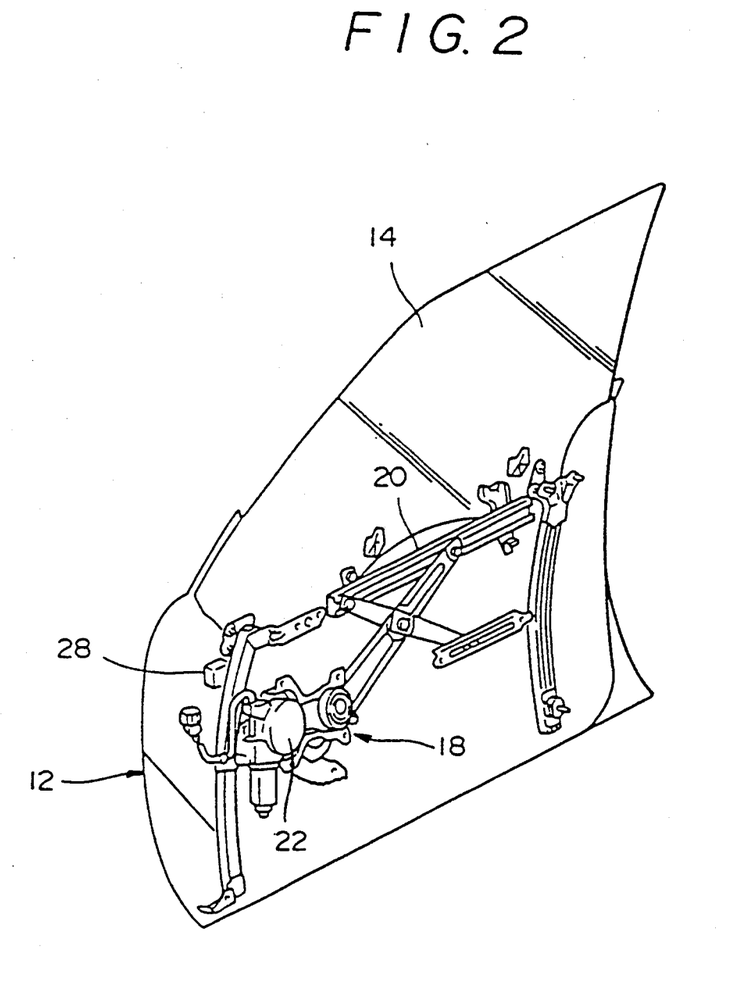
FIG. 2 is a perspective view of a power window regulator.
Figure 5:
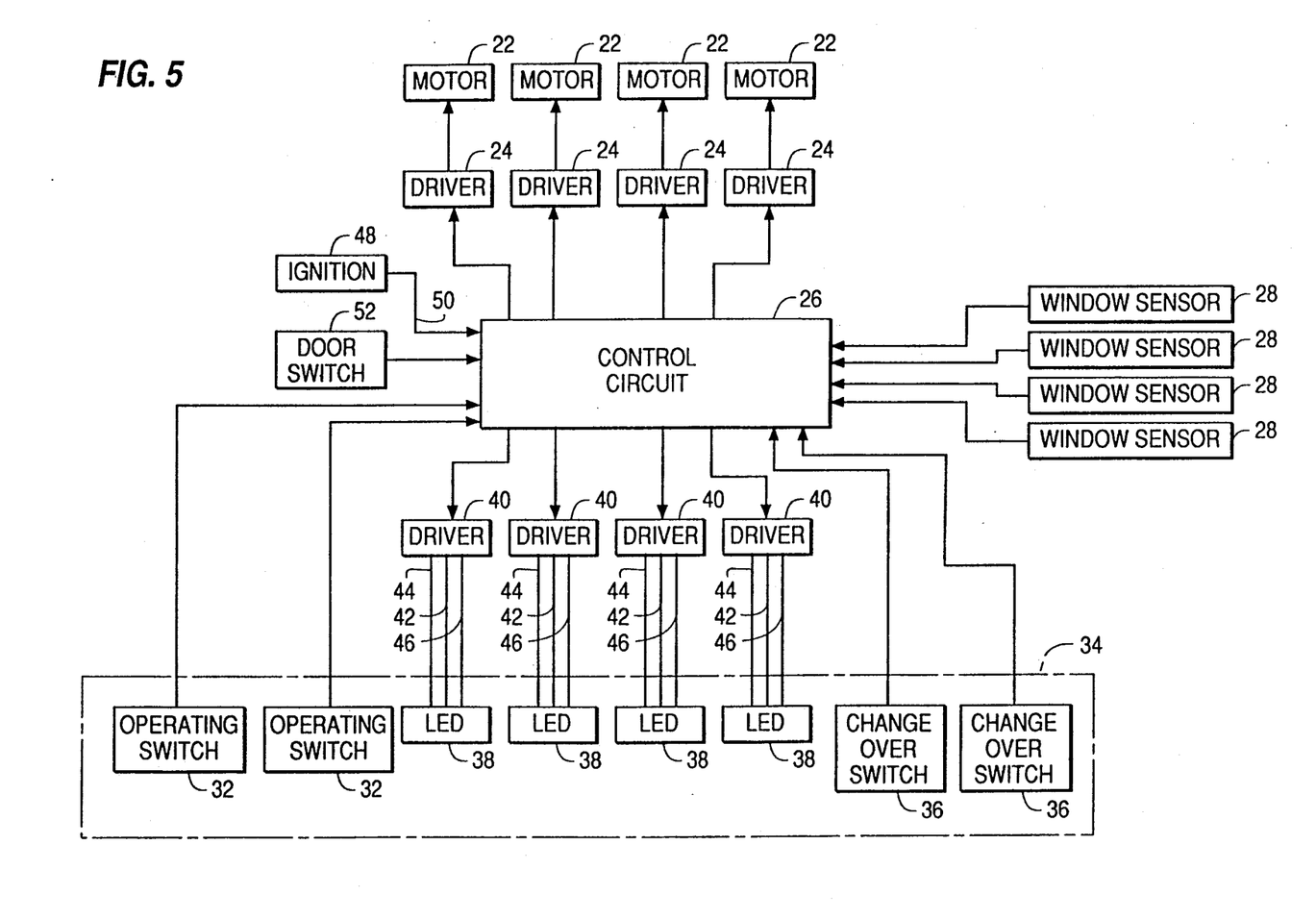
FIG. 5 is a control block diagram.

FIG. 1 illustrates the vicinity of a driver's seat of a vehicle 10 in accordance with an embodiment of the present invention. A door glass 14 is disposed in an opening of an upper portion of a door 12 of the vehicle 10. It should be noted that the vehicle 10, to which this embodiment applies, has four doors in terms of its specifications. The arrangement of the switch device will be described by citing the operator's seat-side door as an example, unless otherwise stated. This door glass 14 can be accommodated in a lower portion of the door 12 and shielded with a door rim 16, so that the door glass 14 can be opened and closed. As shown in FIG. 2, the door glass 14 is mounted on a frame 20 which is moved vertically, as viewed in the drawing, by means of a window regulator 18. The window regulator 18 in accordance with this embodiment, employs a power window apparatus which is driven by a driving force of a motor 22 and is adapted to vertically move the frame 20. As shown in FIG. 5, the motor 22 is connected to a control circuit 26 via a driver 24. In other words, the arrangement is such that when a forward or reverse driving signal is outputted from the control circuit 26 to the driver 24, the motor 22 is driven in a forward or reverse direction in response to this outputted signal, thereby opening or closing the door glass 14.

As shown in FIGS. 2 and 5, a door glass detecting sensor 28, which is connected to the control circuit 26 and capable of detecting whether or not the door glass 14 is fully closed, is mounted on the door 12.

Figure 3:
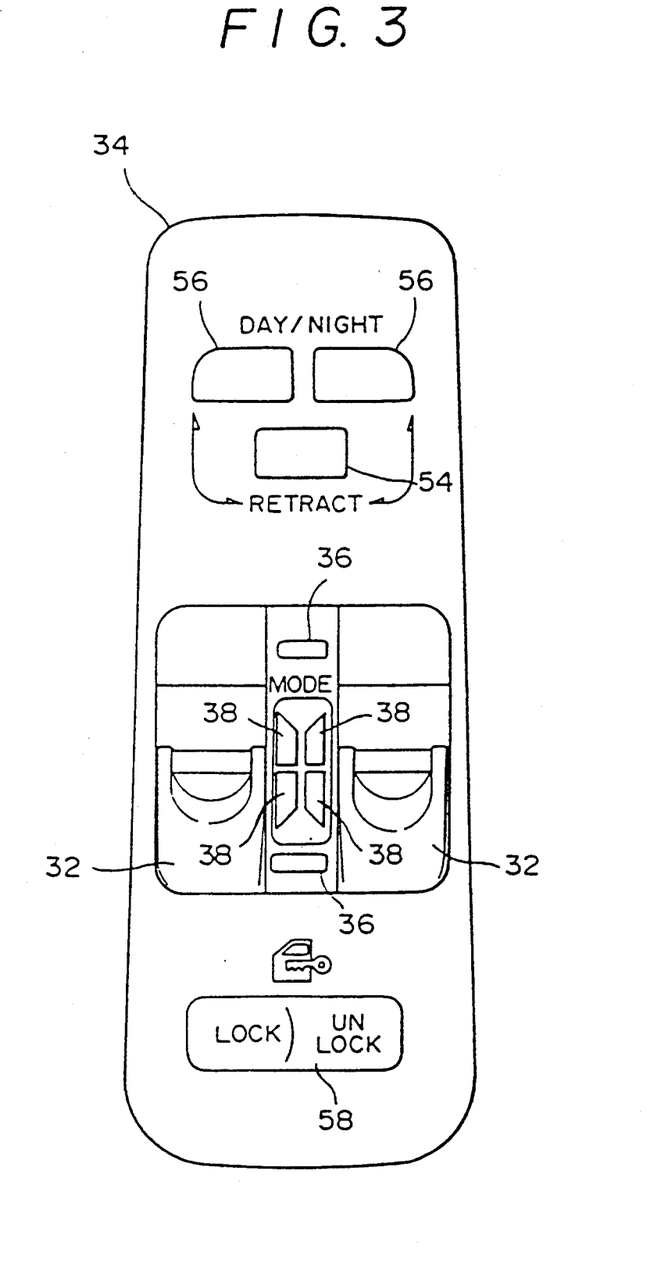
FIG. 3 is a top plan view of a switch unit.
Figure 4:
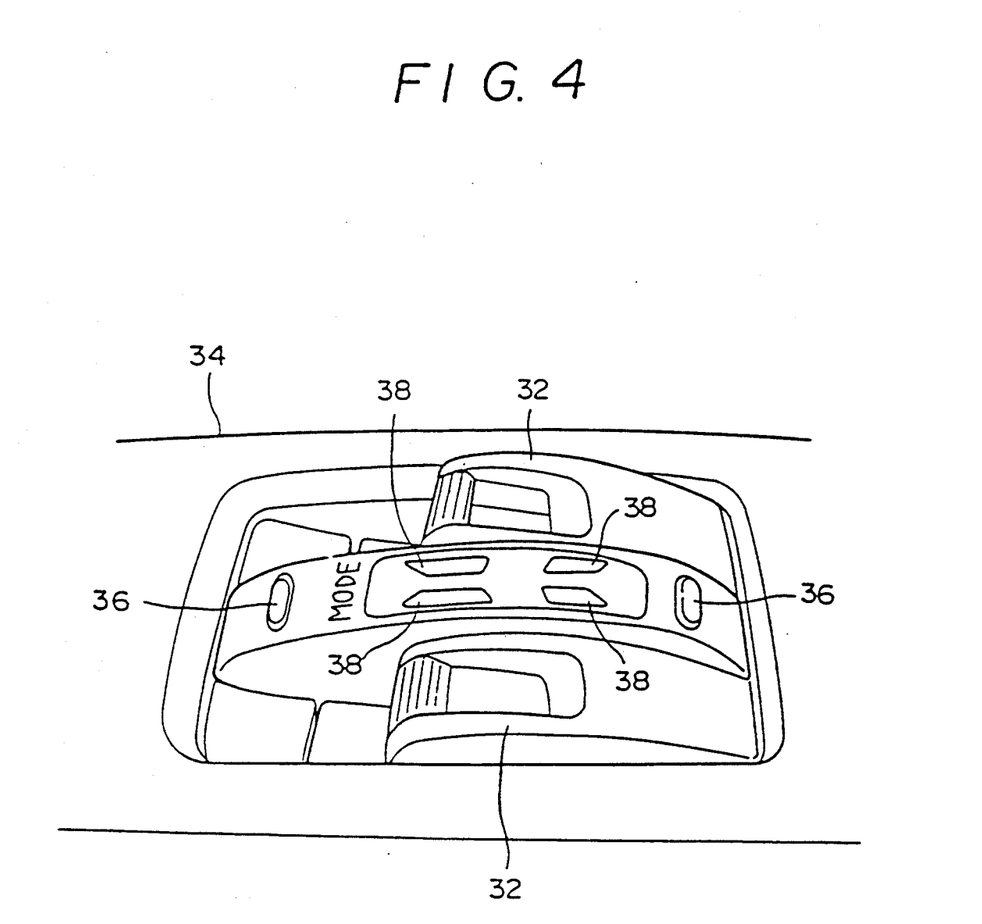
FIG. 4 is a perspective view of the vicinity of operating switches.

Mounted on an arm rest 30, that is fixed to the door rim 16 on the driver's seat side, is a switch unit 34 provided with an operation switch 32 of a motor 22.

As shown in FIGS. 3 and 4, the switch unit 34 is provided with two operating switches 32. Each operating switch 32 is connected to the control circuit 26 and adapted to drive motors 22 (see FIG. 5). These operating switches 32 are respectively adapted to open and close the two door glasses on the right-hand side of the vehicle and the two door glasses on the left-hand side thereof. The switch unit 34 is provided with a mode changeover switch 36 connected to the control circuit 26, so that the function of the control circuit 26 can be changed over by operating this mode changeover switch 36. In other words, one operating switch is used jointly for two functions, thereby reducing the number of the operating switches 32 otherwise required.

In addition, four light-emitting diodes (LEDs) 38 constituting a display are provided on the switch unit 34 and are connected to the control circuit 26 via their respective drivers 40. The LED's 38 are arranged in correspondence with the arrangement of the door glasses 14, i.e., two on the front side of the switch unit 34 and another two on the rear side thereof in two rows extending in a longitudinal direction of the vehicle. Each of the LED's 38 incorporates two light-emitting elements of green and red. A common terminal 42 of the two elements is connected to the driver 40 and a green light-emitting terminal 44 and a red light-emitting terminal 46 are connected separately to the driver 40. Thus the LED's 38 are adapted to emit green or red light.

In addition, operating switches (not shown), for opening and closing the door glasses of the other doors, are respectively mounted on the armrests of these doors.

As shown in FIG. 5, a signal line 50 leading from an IG switch 48 is connected to the control circuit 26 so as to allow the on-off state of the IG switch 48 to be detected. Namely, since the electric power for driving the motor 22 is high, when the IG switch 48 is on, the motor 22 can be unconditionally driven by operating the operating switch 32.

In addition, a door switch 52 is connected to the control circuit 26 to allow state in which the door 12 is open or closed. In the control circuit 26 in accordance with this embodiment, even when the IG switch 48 is turned off, the motor 22 can be driven by operating the operating switch 32 until the door 12 which was opened is initially closed. In addition, when the motor 22 can be driven by means of the operating switch 32, the control circuit 26 allows the LED's 38 to emit green light on the side to which the mode has been changed over by the mode changeover switch 36, thereby informing the occupant of the fact that the power window apparatus is operative.

On the other hand, the control circuit 26 allows the LED 38 to emit red light when the door glass detecting sensor 28 detects that the door glass is not fully closed thereby informing the occupant of the fact that the power window is open.

Figure 6:
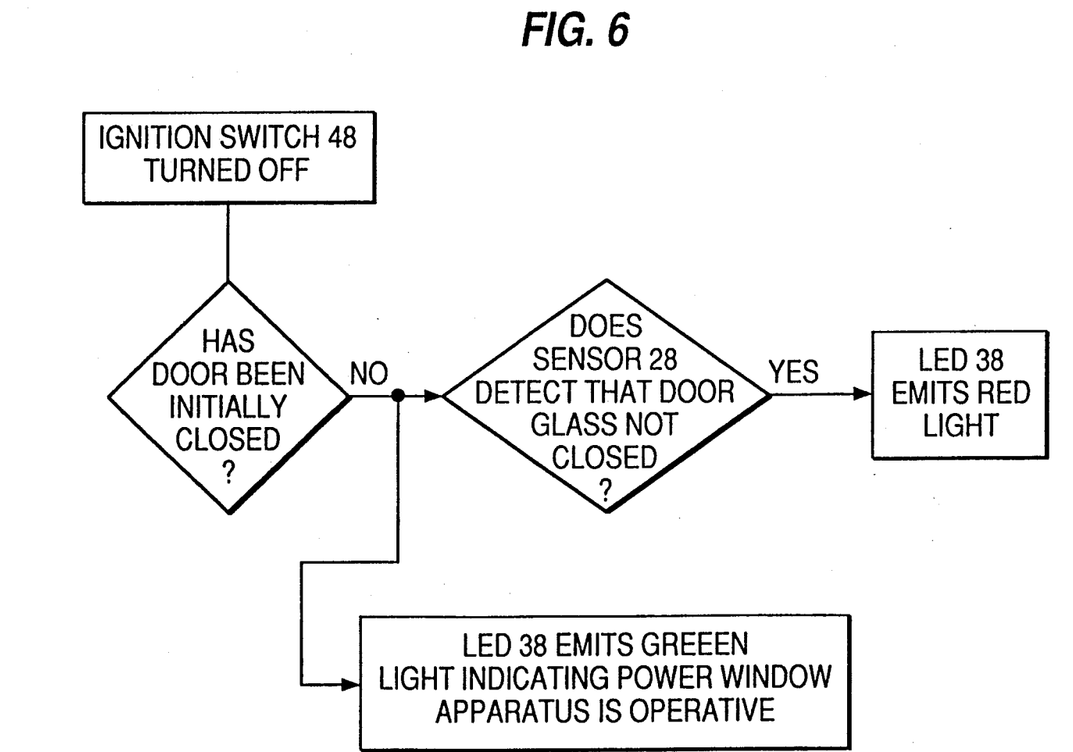
FIG. 6 is a flow chart generally illustrating the operating features of the block diagram of FIG. 5.

In cases where both the condition for emitting green light and the condition for emitting red light are met, the corresponding LED 38 is controlled in such a manner as to emit red and green lights alternately. The aforementioned operational features of the control circuit 26 are generally illustrated in FIG. 6.

The operation of this embodiment will be described hereinunder in more detail.

When the IG switch is on, the LEDs 38 (e.g., the two LEDs 38 on the front side of the vehicle), to which the mode has been changed over by the mode changeover switch 36 and which correspond to the door glasses 14 that can be opened and closed by the operating switches 32, are lit in green color. As a result, the occupant can confirm that the door glasses 14, that are opened and closed by operating the operating switches 32, are those located on the driver's seat side and the assistant's seat side. Here, if the mode changeover switch 36 is operated, the LEDs 38 which have hitherto been lit in green color go out, and the two LEDs 38 on the rear side of the vehicle are lit in green color. Hence, the occupant can confirm that the door glasses 14 that are opened and closed by operating the operating switches 32, are those on the rear seat side.

Since the function of the operating switches 32 can be confirmed by the LED's 38 being lit or unlit, it is unnecessary to provide corresponding operating switches for each of the four door glasses 14. Therefore two operating switches 32 suffice. Accordingly, the number of parts used decreases, and the space for installing other switches (e.g., a door mirror retracting switch 54, door mirror changeover switches 56 for preventing glare, a door lock switch 58, etc.) can be enlarged.

Upon completion of the running of the vehicle, the IG switch 48 is turned off. In this case, in this embodiment, since the opening and closing operation of the door glasses 14 by means of the operating switches 32 is possible, it is unnecessary to turn on the IG switch again even if any of the doors are left unclosed. The fact that a door glass 14 has been left unclosed can be confirmed since the red light of the LED 38 will be turned on. That is, when the IG switch 48 is turned off and the open state of one of the door glasses 14 is detected by the door glass detecting sensor 28, the control circuit 26 causes the corresponding LED 38 to emit a red light. In this case, the LED 38 also needs to be lit in green color because one LED 38 cannot be lit in green and red simultaneously. For this reason, when the two conditions are met, the control circuit 26 divides the period of the LED 38 being lit in green and red into predetermined periods of time and causes them to be lit alternately. As a result, the occupant is capable of confirming that the opening and closing of the door glass 14 by the operating switch 32 is possible and that the door glass 14 is in the open state.

When the IG switch 48 is turned off and the door 12 which was opened is initially closed, the opening and closing operation of the door glass 14 is made impossible, and LED's 38 go out. Accordingly, by visually checking the LEDs 38, the occupant is capable of readily ascertaining whether or not the opening and closing operation of the door glasses 14 is presently possible with the IG switch 48 being turned off.

The following table summarizes the above-described display control.

| Window | Window Left Unclosed | State of LED: Lit/Unlit |
|---|---|---|
| Openable | No | Green light is lit. |
| Unopenable | Yes | Red light is lit. |
| Openable | Yes | Green and red lights are lit alternately. |
| Unopenable | No | LED is unlit. |

Although in this embodiment one LED 38 is made to emit green and red lights, an arrangement may be alternatively provided such that an LED emitting green light and an LED emitting red light are formed as a pair, and four pairs of LEDs are provided. In this case, there is no need to cause them to be lit alternately.

Although in the above-described embodiment, an example has been shown in which the present invention is applied to the door glass of a vehicle, the present invention is not confined to the door window and is also applicable to any window glass of a vehicle which is driven by a motor or the like.

As described above, the switch device in accordance with the present invention offers outstanding advantages in that the power window indicator makes it possible to confirm whether or not the power window apparatus is operative, and that the operating efficiency can be improved.

In addition, the switch device has an advantage in that the open and closed states of the door glasses can be confirmed collectively.

What is claimed is:

1. A switch device for use in a power window apparatus for opening and closing a first door glass of a vehicle through the operation of driving means, comprising:
   an operating switch for operating said driving means;
   said driving means capable of being powered while an ignition switch of said vehicle is on and after the ignition switch has been turned off until a door is initially closed, at which point the driving means becomes unpowerable;
   a display unit disposed in the vicinity of said operating switch having a light; and
   display controlling means, operated by means of said operating switch, for displaying through the emission or extinction of said light on said display unit whether or not said driving means is capable of being powered by a driver by actuation of said operating switch without the driver having to first operate the ignition switch, wherein said display controlling means operates said light of said display unit before said door is initially closed after said ignition switch of said vehicle is turned off.

2. A switch device according to claim 1, further including a second door glass wherein two operating portions are provided in said operating switch and two display portions are provided in said display unit, said two operating portions and two display portions are positioned in correspondence with the arrangement of said first door glass and said second door glass disposed on both sides of said vehicle.

3. A switch device according to claim 1, wherein two display portions for displaying the state of operation of the driving means are provided with said display unit in a longitudinal direction in correspondence with the arrangement of two door glasses disposed along a longitudinal direction of said vehicle on each side of said vehicle.

4. A switch device according to claim 3, further comprising a mode changeover switch for effecting a changeover from one of said two door glasses to the other which is to be opened or closed by said operating switch.

5. A switch device according to claim 3, further comprising a switch unit, wherein said operating switch and said display portions are disposed on said switch unit.

6. A switch device for use in a power window apparatus for opening and closing a first door glass of a vehicle through the operation of driving means, comprising:
   an operating switch for operating said driving means;
   a door glass detecting sensor for detecting whether or not said door glass is fully closed;
   a display unit disposed in the vicinity of said operating switch; and
   display controlling means, operated by means of said operating switch, for displaying on said display unit whether or not said driving means is operative and displaying on said display unit on the basis of an output of said door glass detecting sensor whether or not said door glass is fully closed.

7. A switch device according to claim 6, further including a second door glass wherein two operating portions are provided in said operating switch and two display portions are provided in said display unit, and said two operating portions and two display portions are positioned in correspondence with the arrangement of said first door glass and said second door glass disposed on both sides of said vehicle.

8. A switch device according to claim 6, wherein two display portions are provided with said display unit in a longitudinal direction in correspondence with the arrangement of two door glasses disposed along a longitudinal direction of said vehicle on each side of said vehicle.

9. A switch device according to claim 8, further comprising a mode changeover switch for effecting a changeover from one of said two door glasses to the other which is to be opened or closed by said operating switch.

10. A switch device according to claim 8, wherein said display portion is a light-emitting diode for displaying whether or not said driving means is operative and whether or not said door glass is fully closed.

11. A switch device according to claim 10, wherein said display portion is a light-emitting diode adapted to emit lights of different colors when said driving means is operative and when it is not.

12. A switch device according to claim 11, wherein said controlling means is adapted to cause said light-emitting diode to alternately emit said lights of different colors when the time said driving means is operative and the time said door glass is unclosed coincide.

13. A switch device according to claim 12, further comprising a switch unit, said operating switches and said display portions being disposed on said switch unit.

14. A switch device for use in a power window apparatus for opening and closing a window glass of a vehicle through the operation of driving means, comprising:
an operating switch for operating said driving means;
said driving means capable of being powered while an ignition switch of said vehicle is on and after the ignition switch has been turned off until a door is initially closed, at which point the driving means becomes unpowerable;
a display unit disposed in the vicinity of said operating switch; and
display controlling means, operated by means of said operating switch, for displaying on said display unit whether or not said driving means is capable of being powered by a driver by actuation of said operating switch without the driver having to first operate the ignition switch, wherein said display controlling means operates said display unit before said door is initially closed when an ignition switch of said vehicle is turned off.

15. A switch device for use in a power window apparatus for opening and closing a window glass of a vehicle through the operation of driving means, comprising:
an operating switch for operating said driving means;
a display unit disposed in the vicinity of said operating switch;
display controlling means, operated by means of said operating switch, for displaying on said display unit whether or not said driving means is operative; and
a window glass detecting sensor for detecting whether or not said window glass is fully closed, said display controlling means being adapted to display on said display unit on the basis of an output of said window glass detecting sensor whether or not said window glass is fully closed.

* * * * *